United States Patent [19]

Bouvet et al.

[11] 4,320,781
[45] Mar. 23, 1982

[54] THREE-WAY ELECTRICALLY-ACTUATED HYDRAULIC DISTRIBUTOR

[75] Inventors: Jean M. Bouvet, Boulogne-Billancourt; Philippe Quemerais, Thurins, both of France

[73] Assignees: Regie Nationale des Usines Renault, Billancourt; Renault Vehicules, Lyons, both of France

[21] Appl. No.: 83,691

[22] Filed: Oct. 11, 1979

[30] Foreign Application Priority Data

Oct. 16, 1978 [FR] France ................................ 78 29442

[51] Int. Cl.³ .......................................... F15B 13/044
[52] U.S. Cl. ............................ 137/625.65; 137/625.5; 137/DIG. 2; 251/139; 251/141
[58] Field of Search ......... 137/625.5, 625.65, DIG. 2; 251/139, 141

[56] References Cited

U.S. PATENT DOCUMENTS

| | | | |
|---|---|---|---|
| 3,628,767 | 12/1971 | Lombard | 251/141 X |
| 3,795,383 | 3/1974 | Lombard et al. | 251/141 X |
| 3,828,818 | 8/1974 | Hunt | 137/625.65 |
| 3,876,177 | 4/1975 | Putschky | 251/139 X |
| 3,929,315 | 12/1975 | Rieth | 251/141 X |

FOREIGN PATENT DOCUMENTS 2178464  11/1973  France .

*Primary Examiner*—Gerald A. Michalsky
*Attorney, Agent, or Firm*—Beveridge, DeGrandi & Kline

[57] ABSTRACT

A first member of a magnetic housing has a core with a central passage and contains an electrical coil, and a second member of the housing has a ball cavity which receives and guides a magnetic ball. A central conduit and peripheral conduits enter the cavity of the second member. When the coil is activated, the magnetic field created thereby moves the ball into contact with the core to close the central passage in the first member, leaving the central and peripheral conduits in communication with each other. When the coil is deactivated, fluid pressure moves the ball to a position where it closes the central conduit so the central passage and the peripheral conduits will be in communication.

6 Claims, 1 Drawing Figure

MAGNETIC BALL
COVERED WITH A
NONMAGNETIC MATERIAL

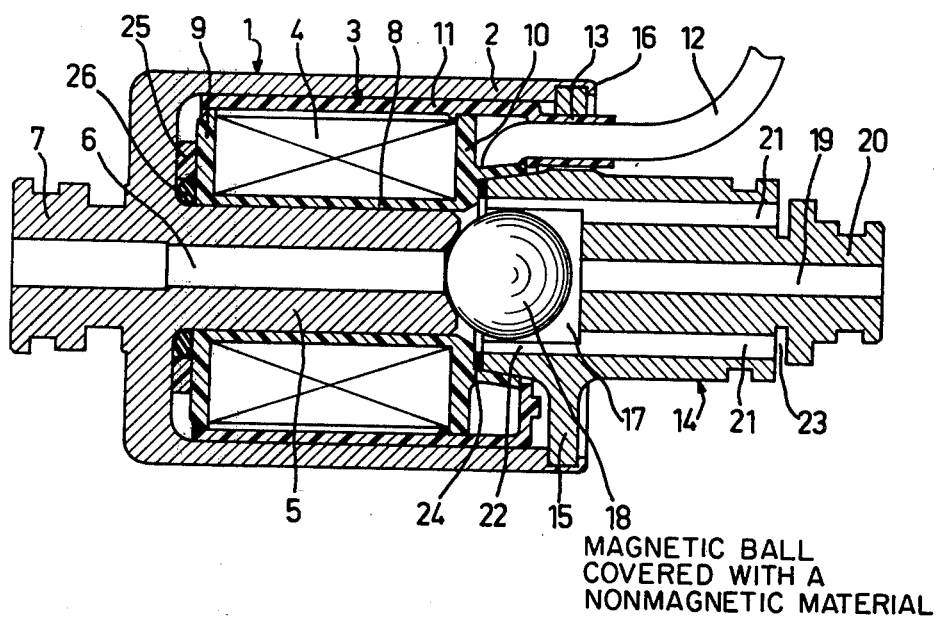
MAGNETIC BALL
COVERED WITH A
NONMAGNETIC MATERIAL

THREE-WAY ELECTRICALLY-ACTUATED HYDRAULIC DISTRIBUTOR

BACKGROUND OF THE INVENTION

The present invention, is concerned with an electrically actuated three-way hydraulic distributor which utilizes a magnetic ball as a sealing element.

A number of forms of three-way electro-distributors are already known. The most widespread of these are of the slide type wherein a central pin is movable by energization of an electromagnetic coil. The pin has various shoulders which, during movement, act as slides to block or uncover openings connected to the hydraulic circuit. This type of distributor requires precise and onerous machining procedures which makes these devices relatively expensive. Furthermore, hydraulic distributors of this type are relatively cumbersome, taking into consideration the slide must be large enough to avoid undue sensitivities to and damage from the impurities in the hydraulic fluid.

Magnetic ball valves have been used in hydraulic electromagnetic sluice gates, as described in French Pat. No. 1,422,165, for example. In such a device, an electromagnetic coil is mounted on the side of a magnetic element which includes a fixed core with a central passage for hydraulic fluid. A magnetic ball is aligned with the core axis and is held within an external cover with axial passages for the hydraulic fluid. When the coil is energized by the magnetic ball, it moves into sealing engagement with a seat at the end of the core to obstruct the central passage. When the electro-magnetic coil is deenergized, the pressure of the hydraulic fluid in the central passage of the core pushes back the ball, which comes out of its seat to permit the hydraulic fluid to pass. Thus, in an all or nothing manner, this operates as an electromagnetic sluice gate for interrupting the hydraulic circuit.

The object of the present invention is to provide an electrically actuated three-way hydraulic distributor which is particularly easy to manufacture and whose functioning is particularly simple.

SUMMARY OF THE INVENTION

An electrically actuated three-way hydraulic distributor includes a first member which has a central passage formed in a central magnetic core, an electric coil for creating a magnetic field, a magnetic ball, and a second member which is engaged with the first member and has a cavity for receiving and guiding the ball. When the coil is activated, the ball is moved by the magnetic field to a position where it obstructs the central passage in the first member. The second member has a central conduit which is obstructed by the ball when the coil is deactivated. The invention differs from the prior art by providing a plurality of peripheral conduits in the second member, at locations where they enter the cavity at its periphery where they cannot be obstructed by the ball in any position.

Preferably, there is a plurality of the peripheral conduits, interconnected by a radial peripheral groove in the second member. The ball-receiving cavity in the second member preferably has axial grooves which lead to the peripheral conduits. The ball may be covered with a nonmagnetic metal such as copper, thereby providing a clearance between the magnetic bodies. This diminishes the tendency of the ball to stick to the core by residual magnetism when the electric coil is deactivated.

The housing members are preferably connected together by crimping the edge of the first member onto a radial flange of the second member. To prevent leakage, a sealing washer is located between the second member and the casing of the electric coil which is located in the first member.

The invention will be more fully understood by referring to the preferred embodiment described hereinbelow for illustrative purposes only.

BRIEF DESCRIPTION OF THE DRAWING

The drawing is a longitudinal sectional view of a preferred embodiment of the invention.

DESCRIPTION OF A PREFERRED EMBODIMENT

The electrically actuated three-way distributor includes two principal magnetic housing members 1 and 14, a magnetic ball 18 and an electrical coil 3 which creates a magnetic field through the housing member to move the ball 3. The first housing member 1 is made of magnetic material and includes an external, cylindrical casing portion 2 which encloses a nonmagnetic casing 3 of an electromagnetic coil 4. The element 1 also has a central, fixed core 5 located within the casing 3 of the electromagnetic coil 4. The central core 5 is pierced by a central passage 6 for hydraulic fluid. The element 1 also has a coupling connector 7 which is connectible to a system of flexible hydraulic conduits.

The casing 3 for coil 4 is made of two pieces of nonmagnetic material such as plastic, formed to facilitate the winding of the conductor wires of the coil. An internal sleeve 8 contacts the core 5 and has radial flanges 10 which seat the coil 4. The periphery of casing 3 is a cylindrical member 11 which is snap-fitted over the flanges 9 and 10 to enclose the coil 4. The wires 12 which supply electric current to the coil 4 lead outwardly from the device through an axial channel 13 which is integrally formed with the casing member 11.

The second housing member 14 is axially aligned with the electromagnet element 1. Member 14 is made of magnetic material and has a radial flange 15 which projects into a passage-way drilled in the end of external casing 2 of the element 1. The member 14 is held in the illustrated position by crimping the extreme edges 16 of the external casing 2 over the radial flange 15. This also provides a closed magnetic circuit through the members 1 and 14. The flange 15 has an opening which accommodates the channel 13 for the electric wires.

The connector 14 has a cylindrical cavity 17 which retains and guides the ball 18 which is made of magnetic material. The dimensions of the cavity 17 permit axial movement of the ball 18, with a slight radial play on the inside of the said cavity.

Member 14 has a central longitudinal conduit 19 which extends from the cavity 17 to a connector portion 20. The member 14 also has four peripheral longitudinal conduits 21 which lead from axial grooves to a common radial, peripheral groove 23 on the connector portion 20.

The inner end of the member 14 bears and seals against a sealing washer 24 which lies in contact with the frontal face of the electromagnetic coil casing 3. The rear end of casing 3 is kept suitably separated from the bottom of element 1 by a washer 25 and a gasket 26.

The whole assembly is kept tight by the previously-mentioned crimping 16 of the radial flange 15.

The free end of the core 5 provides a seat for the ball 18 and, for that purpose, it has a surface in the shape of a truncated cone, which can be obtained, preferably by rolling. In order for the ball made of magnetic material to be subjected to the action of the electromagnetic coil, it is advantageous for it to be covered with a coating of a nonmagnetic material not shown in the drawing.

The dimensions of the cavity 17 and the distance between the connector 14 and the seat on the core 5 are selected so that the ball can occupy two positions. In the position shown in the drawing, the ball blocks the hydraulic fluid passge 6, but it does not obstruct the communication between the central passage 19 of the connector 14 and the cavity 17. Thus, the hydraulic fluid can pass freely from the peripheral system of conduits 21 to the central system of conduit 19, inasmuch as both systems flow into the cavity 17.

In the other position of the ball 18, the ball obstructs the central conduit 19 of the connector 14, leaving passage 6 open for the flow of hydraulic fluid through the peripheral grooves and into the peripheral system of conduits 21.

The operation of the electrically actuated three-way hydraulic distributor of the invention will now be described. When the electromagnetic coil 4 is energized, the ball 18 is pressed into the seat at the end of the fixed core 5. The conduit 6 which supplies pressurized fluid is closed, and the peripheral conduits 21 are in communication with the central system of conduits 19. If a fluid-receiving device is connected to the peripheral systems of conduits 21 and a tank is connected to the central conduit 19, the receiver will then be connected with the tank.

When the electromagnetic coil 4 is de-energized, the pressure of fluid in the central system of conduits 6 will move the ball 18 against the end of the central conduit 19. This closes conduit 19 so that the pressurized fluid then passes between the central core 5 and the ball 18, into and through the peripheral systems of conduits 21 to a receiving device, for example.

In some instances, residual magnetizing may slow down the action of the device due to the sticking of the ball on its seat. This is not a serious problem since the device operates on an all-or-nothing basis. To alleviate this effect, the ball may be coated with a layer of nonmagnetic material, copper being a suitable material for this purpose.

The distributor of the present invention can be used in a number of applications. It is particularly suitable for controlling hydraulic fluids for automatic transmissions of automotive vehicles. In such an environment, two distributors made in accordance with the invention are used, with each of them connected to a receiver. One or the other of the electrodistributors is selectively controlled to obtain a functioning in sequence.

Persons familiar with the field of the invention will realize that the principles of the invention may be embodied in a variety of devices which are different from the disclosed preferred embodiment. Accordingly, it is emphasized that the invention is not limited to the disclosed embodiment but is embracing of a wide variety of structures which fall within the spirit of the following claims.

We claim:

1. A 3-way electromagnetic valve for controlling the flow of a fluid comprising:

a first member made of magnetic material including a central core and an external casing, said core having an input passage therethrough for the flow of fluid, said external casing defining a cavity for enclosing an electromagnetic coil, a first coupling connector means leading to said passage and located at one end of said central core, a valve seat at the free end of said central core, a second member made of magnetic material and having a radial flange cooperating with said external casing portion to close said cavity, said second member including an open ball-enclosing cavity, a central conduit constituting a first output for the flow of fluid and a plurality of peripheral conduits constituting a second output for the flow of fluid, said peripheral conduits entering said ball-enclosing cavity at its periphery and communicating with said central conduit through said cavity, said second member having second coupling connector means leading to said central conduit and said peripheral conduits, said second coupling connector means being located at the opposite end of the valve from the first coupling connector means and a magnetic ball located within said cavity, said ball being movable in response to energization of the electromagnetic coil to a position where it contacts said valve seat and closes said input passage, the dimensions of said ball-enclosing cavity being such that said central conduit is closed by said ball when the electromagnetic coil is deenergized and that said peripheral conduits cannot be obstructed by said ball in any position whereby said second output in said second member is connected either with said input in said first member or with said first output in said second member.

2. The valve of claim 1 wherein said second member has, in said internal cavity, axial grooves communicating with said peripheral conduits.

3. The valve of claim 1 or claim 2 wherein the second member has a radial, peripheral groove which interconnects the peripheral conduits.

4. The valve of claim 1 wherein the ball is covered with a nonmagnetic material.

5. The valve of claim 1 wherein the second member has a radial flange, and the first member has edges which are crimped onto the radial flange to provide a closed magnetic circuit through the two members.

6. The valve of claim 1 having a second casing which encloses the electric coil, said valve including a sealing washer located between said second casing and said second member.

* * * * *